United States Patent
Cousins (12)
(10) Patent No.: US 6,618,385 B1
(45) Date of Patent: Sep. 9, 2003

(54) HIGH PERFORMANCE, HIGH BANDWIDTH, AND ADAPTIVE LOCAL AREA NETWORK COMMUNICATIONS

(75) Inventor: Robert Cousins, Saratoga, CA (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/159,703

(22) Filed: Sep. 23, 1998

(51) Int. Cl.[7] ............................................. H04L 12/28
(52) U.S. Cl. ........................ 370/401; 370/230; 370/235; 370/286; 375/140; 375/354; 713/152; 713/161
(58) Field of Search .................... 370/420, 463.5, 370/401, 457, 463, 465; 375/200, 130, 463; 713/152, 160, 161; 709/227, 229, 220, 221, 222; 340/310.01

(56) References Cited

U.S. PATENT DOCUMENTS

| | | | | | |
|---|---|---|---|---|---|
| 5,519,693 A | * | 5/1996 | Galuszka et al. | ............. | 370/24 |
| 5,684,962 A | * | 11/1997 | Black et al. | ........... | 395/200.15 |
| 5,708,659 A | * | 1/1998 | Rostoker et al. | ............ | 370/392 |
| 5,841,990 A | * | 11/1998 | Picazo, Jr. et al. | ...... | 395/200.79 |
| 5,931,928 A | * | 8/1999 | Brennan et al. | .............. | 710/68 |
| 5,974,149 A | * | 10/1999 | Leppek | ........................ | 380/25 |
| 5,991,292 A | * | 11/1999 | Focsaneanu et al. | ........ | 370/352 |
| 5,995,512 A | * | 11/1999 | Pogue, Jr. | .................... | 370/419 |
| 6,011,804 A | * | 1/2000 | Bertin et al. | ................. | 370/468 |
| 6,026,088 A | * | 2/2000 | Rostoker et al. | ............ | 370/395 |
| 6,072,803 A | * | 6/2000 | Allmond et al. | ............ | 370/445 |
| 6,108,330 A | * | 8/2000 | Bhatia et al. | ............... | 370/352 |
| 6,178,185 B1 | * | 1/2001 | Marks | ......................... | 370/514 |
| 6,240,513 B1 | * | 5/2001 | Friedman et al. | ............ | 713/152 |
| 6,263,077 B1 | * | 7/2001 | Zuranski et al. | ............ | 379/410 |
| 6,292,559 B1 | * | 9/2001 | Gaikwad et al. | ............ | 379/417 |
| 6,337,877 B1 | * | 1/2002 | Cole et al. | ................... | 375/222 |
| 6,377,640 B2 | * | 4/2002 | Trans | .......................... | 375/354 |

\* cited by examiner

*Primary Examiner*—Dang Ton
*Assistant Examiner*—Tri H. Phan (57) ABSTRACT

An apparatus, method, and system to provide an open, easy-to-use, robust, and reliable Local Area Network (LAN) system that is capable of handling high data throughput and high bandwidth communication applications and at the same time, is adaptive to changing conditions is provided. Prior to the actual data transfer, a network initialization process is carried out to determine the maximum available data transfer throughput, optimized bandwidth, optimized transfer conditions, and electrical characteristics between two devices on the LAN. These parameters are then utilized to determine the maximum allowable data transfer rate and the optimum data transfer conditions between the two devices.

39 Claims, 7 Drawing Sheets

HIGH PERFORMANCE, HIGH BANDWIDTH, AND ADAPTIVE LOCAL AREA NETWORK COMMUNICATIONS

FIELD OF THE INVENTION

The invention generally relates to network technology, and more particularly relates to Local Area Network (LAN) technology.

BACKGROUND OF THE INVENTION

The proliferation of personal computers as a business tool throughout organizations such as corporations, institutions, and others triggers a requirement to provide communications capability between these computers as well as between different types of computers. In general, through the installation of an adapter card in each personal computer, cabling, software, and special computers known as servers, Local Area Networks (LANs) can be set up. This type of network allows persons within a localized geographical area such as a building or campus to communicate with each other, share peripheral devices such as printers, and to have access to software programs and database information residing on servers. By linking these LANs together, a Wide Area Network (WAN), such as what is commonly known as the Internet, can be created.

There are several LAN technologies in use today with Ethernet (a.k.a. IEEE 802.3 and its derivatives) being far the most popular LAN technology due to its openness, ease of use, robustness, and reliability. Essentially, for Ethernet LANs, access to the shared medium (e.g., twisted pair wires, coaxes, fiber optics, etc.) is controlled by a media access control (MAC) mechanism embedded in the Ethernet interface adapter card located at each station. The MAC is controlled by the Carrier Sense Multiple Access with Collision Detection (CSMA/CD) Protocol.

While originally envisioned as a shared COAX broadcast network, it has evolved into a twisted pair (TP) based point-to-point network with hub devices handling the interconnections between nodes known as 10baseT (for the 10 megabit transfer rate version) or 100baseT (for the 100 megabit transfer rate version). To function properly, these TP based LAN schemes have specific requirements such as wire electrical characteristics and maximum allowable wire lengths. Accordingly, if the length of a TP wire exceeds the allowable wire length specified or if the wire characteristics do not meet the requirements specified, the Ethernet LAN connection may be undependable or may not even be operable. On the other hand, if a wire exceeds these requirements, the Ethernet LAN connection can not perform beyond its rated maximum throughput.

Demands for applications requiring high bandwidth and high data throughput such as video conferencing, on-demand video download, and others continue to increase. At the same time, communications between high performance servers on an Ethernet LAN also require very high data throughput. These demands often exceed the optimal available network throughput in conventional Ethernet LANs. Ethernet LANs with greater than the normal operating distance are also in demand. As a result of the demands for greater operating distance and throughput, secondary networking technologies are adopted in Ethernet LANs. An example of the secondary networking technologies is the use of Fiber Optics instead of wire. However, the adoption of a non-Ethernet solution carries with it a variety of added burdens and costs.

Furthermore, in normal operations, 10baseT and 100baseT Ethernet LANs are subject to a host of problems. One common problem involves imperfect connections between computers due to loose or broken cables that are caused by human abuse, furniture pinching, normal office wear-and-tear, and others. In conventional Ethernet LANs, the attached computer is cut off from the network even if only a single conductor loses continuity.

Thus, a need exists for a method, apparatus, and system to provide an open, easy-to-use, robust, and reliable LAN that is capable of handling high data throughput and high bandwidth communication applications and at the same time, is adaptive to changing conditions to allow for gradual degradation.

SUMMARY OF THE INVENTION

Accordingly, the present invention provides a method, apparatus, and system to provide an open, easy-to-use, robust, and reliable a Local Area Network (LAN) that is capable of handling high data throughput and high bandwidth communication applications and at the same time, is adaptive to changing conditions to allow for gradual degradation and open for future enhancements.

The present invention meets the above need with a LAN interface adapter apparatus that comprises: an interface circuit coupled between a data terminal device and a LAN, a transmit circuit coupled to the interface circuit, and a receive circuit coupled to the interface circuit. The LAN interface adapter apparatus is compatible to present-day 10baseT and 100baseT and optionally 1000base T LANs.

The interface circuit performs a network initialization process with another data terminal device having a substantially similar interface adapter apparatus coupled to the LAN prior to a data transfer between the two devices. The network initialization process determines information related to available data throughput, optimized bandwidth, optimized transfer conditions, and electrical characteristics of a connection between the devices. Optionally, the interface circuit further encrypts data for transmission and decodes encrypted data received. The transmit circuit utilizes the information determined from the network initialization process for transmitting data. The receive circuit utilizes the information determined from the network initialization process for receiving data.

If using encryption, the network initialization process also determines a session key for use in decoding encrypted data. The network initialization process further determines which one of the two data terminal devices is designated a Data Terminal Equipment (DTE) and which device is designated a Data Communication Equipment (DCE). The electrical characteristics of the connection between the devices are used to make adjustments and compensations on a data signal from the DTE to obtain a desired data signal at the DCE. Transmitting and receiving data are formatted in data frames such that each data frame is made up of multiple data packets. The initialization process also provides a framework for future enhancements.

All the features and advantages of the present invention will become apparent from the following detailed description of its preferred embodiment whose description should be taken in conjunction with the accompanying drawings.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention. While the following detailed description is applicable to Ethernet Local Area Networks (LANs), it is to be appreciated that it is equally applicable to other types of LANs such as HDLC, Token Ring, and Token bus standards (IEEE 802.4–802.5) as well as serial data transfer standards such as the IEEE RS-232 Interface, the IEEE RS-422 Interface, the IEEE RS-423 Interface, and others. In the following discussions of the present invention, certain processes and steps are realized as a series of instructions (e.g., software program) that reside within computer readable memory units of a computer system and executed by the processor of the computer system.

In accordance to the present invention, prior to the actual data transfer, a network initialization process is carried out to determine the maximum available data transfer throughput, optimized bandwidth, and optimized transfer conditions. The network initialization process also negotiates the number of twisted pair wires to use, detects and identifies scrambled wires, determines the compression scheme to use, determines the encryption session key, determines the protocol-related capabilities, assigns DTE and DCE roles between devices, and other relevant parameters between two devices on the LAN. These parameters are then utilized in a predetermined well known modulation communications technique such as spread spectrum or Quadrature Amplitude Modulation (QAM) to accordingly adjust the data transfer rate between the two devices. In so doing, data throughput and bandwidth can be optimized given the condition and quality of the line connection.

Moreover, under the present invention, the data throughput is limited only by physics such as characteristics of the twisted pair wires and not by network protocol as in conventional Ethernet LANs. To this end, the present invention implements different technologies such as compression and packetization to decrease the time requiring in data processing and transfer. In addition, the present invention implements packet level encryption to provide data security at the chip level.

Figure 1:
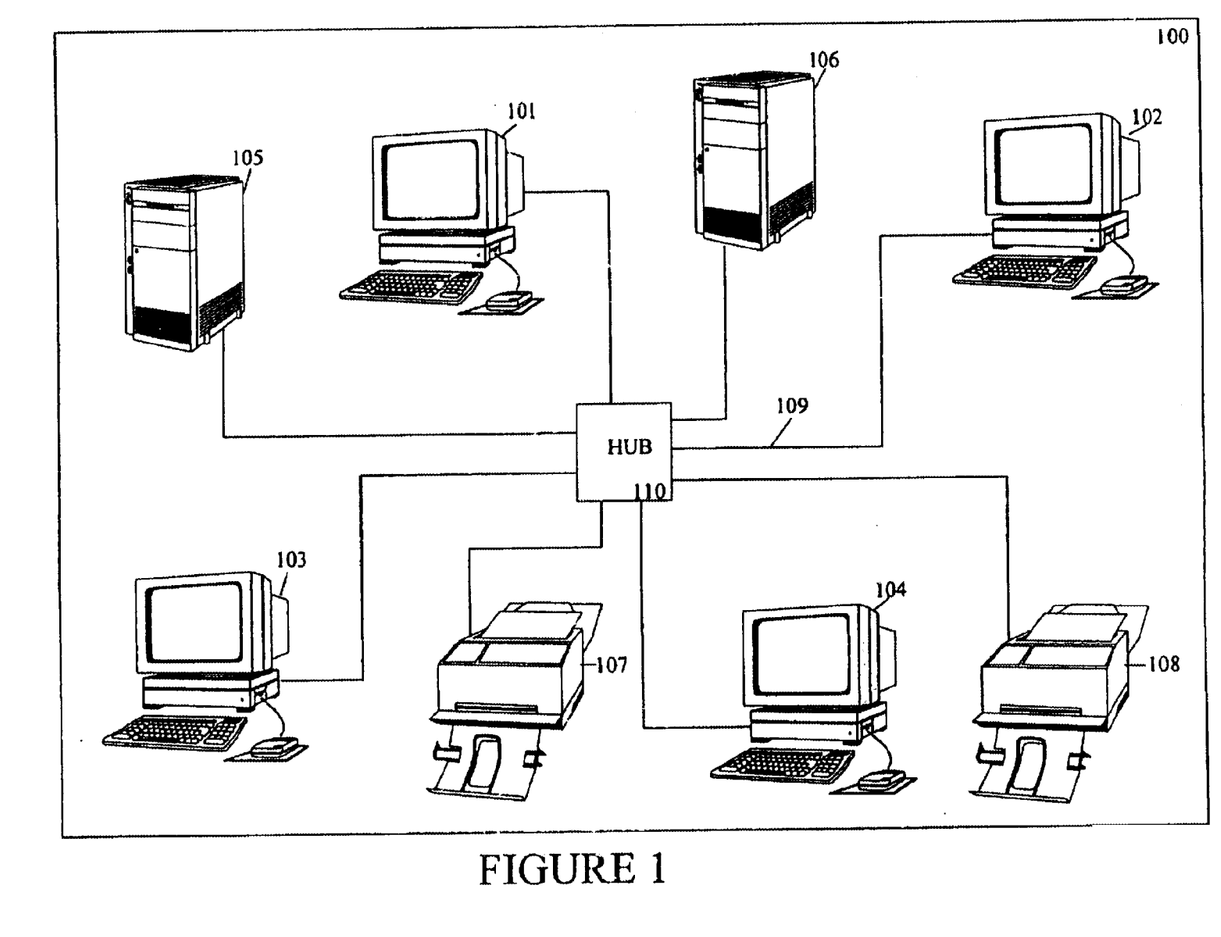
FIG. 1 is a block diagram illustrating, as an example, a Local Area Network (LAN) 100 upon which the present invention may be implemented or practiced.

Reference is made to FIG. 1 illustrating, as an example, a diagram of LAN 100 upon which the present invention may be implemented or practiced. LAN 100 consists of physical medium 109 used to carry data signals between computer systems 101–104, servers 105–106, and peripheral devices 107–108 that are coupled to together via hub 110. It should also be clear to a person of ordinary skill in the art that LAN 100 may be further connected to other networks via hub 110 to form a wide area network (WAN) or an inter-network. In the preferred embodiment, the physical medium is category-3 (Cat-3) twisted pair wires. As such, the present invention should be applied to each twisted pair wire individually. It is to be appreciated that the physical medium can be of other types such as category-5 (Cat-5) twisted pair wires, coax cables, fiber optics, and others. Also, in the preferred embodiment, computers 101–104, servers 105–106, and peripheral devices 107–108 can be of different makes and models.

Unlike a traditional Ethernet hub, hub 110 is a store-and-forward device which is used to buffer data and manage data flows between its ports (a.k.a. taps) to which computer systems 101–104, servers 105–106, and peripheral devices 107–108 are coupled. It is to be appreciated that each of computer systems 101–104, servers 105–106, and peripheral devices 107–108 may have different data transfer rates. Preferably, hub 110 has the capability to manage not only LAN data flow but isocronous data flows of currently undefined format.

Servers 105 and 106 are used to store common application software and database information that can be accessed by users operating computer systems 101–104. In other words, servers 105 and 106 support different applications for users in LAN 100. Additionally, servers 105 and 106 may act as network administrators to control data traffic as well as maintain the LAN. Servers 105 and 106 may also serve as back-up data storage units. Computer systems 101–104 can be used to perform independent user tasks or tasks that required shared data. In accordance to the present invention, computer systems 101–104 have the capability to transfer data requiring high bandwidth and high throughput data including voice and video data between themselves through applications such as video and voice conferencing over physical medium 109. Peripheral devices 107 and 108 are printers that are shared by servers 105–106 and computer systems 101–104. While peripheral devices 107 and 108 may be printers, they can be other types of devices such as scanners, telephone equipment, and others.

To connect to physical medium 109, hub 110, each of computers systems 101–104, each of servers 105–106, and each of peripheral devices 107–108 has an interface adapter implemented as part of their hardware. In the preferred embodiment, each interface adapter comprises the necessary circuitry to perform substantially similar tasks to those carried out by a conventional Ethernet interface adapter. The conventional Ethernet circuitry is well known to persons of ordinary skill in the art and is therefore not further discussed. However, the interface adapter comprises additional circuitry to perform functions that are in accordance to the present invention.

It should be clear to a person of ordinary skill in the art that hub 110 may be omitted from LAN 100 in an alternative embodiment of LAN 100. In this alternative embodiment, the role of hub 110 may be assumed by one or more of servers 105–106, in addition to whatever duties they have. More importantly, in this alternative embodiment, any two devices (e.g., computer systems 101–104, servers 105–106, and peripheral devices 107–108) can be connected together by a twisted pair wire 109. Unlike conventional Ethernet LANs, this regular twisted pair wire 109 is not a null modem cable and is therefore, more cost efficient. As is well known, a null modem cable is used to match an input connection of a DTE with an output connection of a DCE and vice versa. Under the present invention, such null modem cable is not necessary because the two devices can negotiate in a network initialization session apriori to determine which device is to act as the DTE (sender) and which is to act as the DCE (receiver) in the data transfer. Such network initialization session is discussed in greater detail in FIG. 4.

Figure 2:
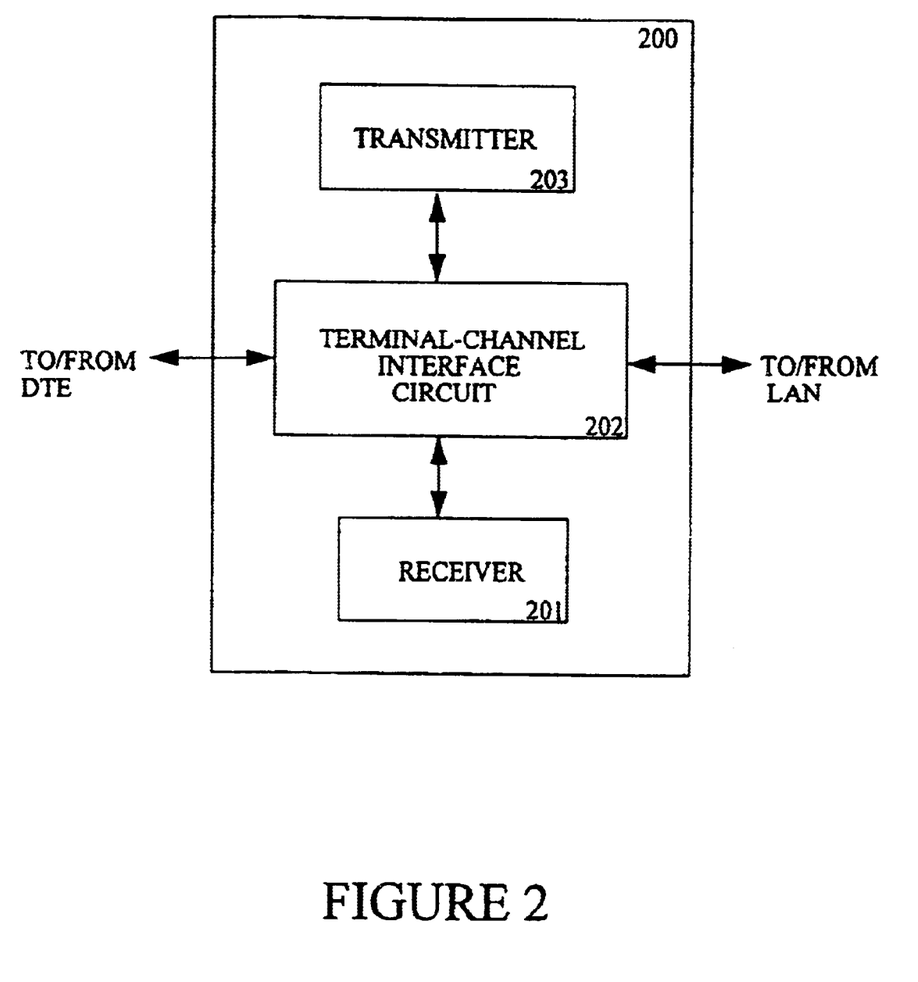
FIG. 2 is a block diagram illustrating the relevant components of interface adapter 200 that is used to connect a hub, computer system, server, peripheral device, or others to LAN 100 in accordance to the present invention.

Referring now to FIG. 2 illustrating a block diagram of the relevant components of interface adapter 200 in accordance to the present invention. As shown in FIG. 2, interface adapter 200 consists of receiver 201, terminal-channel interface circuit 202, and transmitter 203. Terminal-channel interface circuit 202 provides the interface between a Data Terminal Equipment (DTE) (e.g., computer systems 101–104 and the LAN to which the DTE is coupled. More particularly, terminal-channel interface circuit 202 acts as the interface between the DTE interface and receiver 201 and as the interface between the network interface and transmitter 203. Terminal-channel interface circuit 202 also performs functions including formatting, packetization, encryption, compression, power management, transfer management, and other operations on data signals received and transmitted from/to the LAN.

Figure 3:
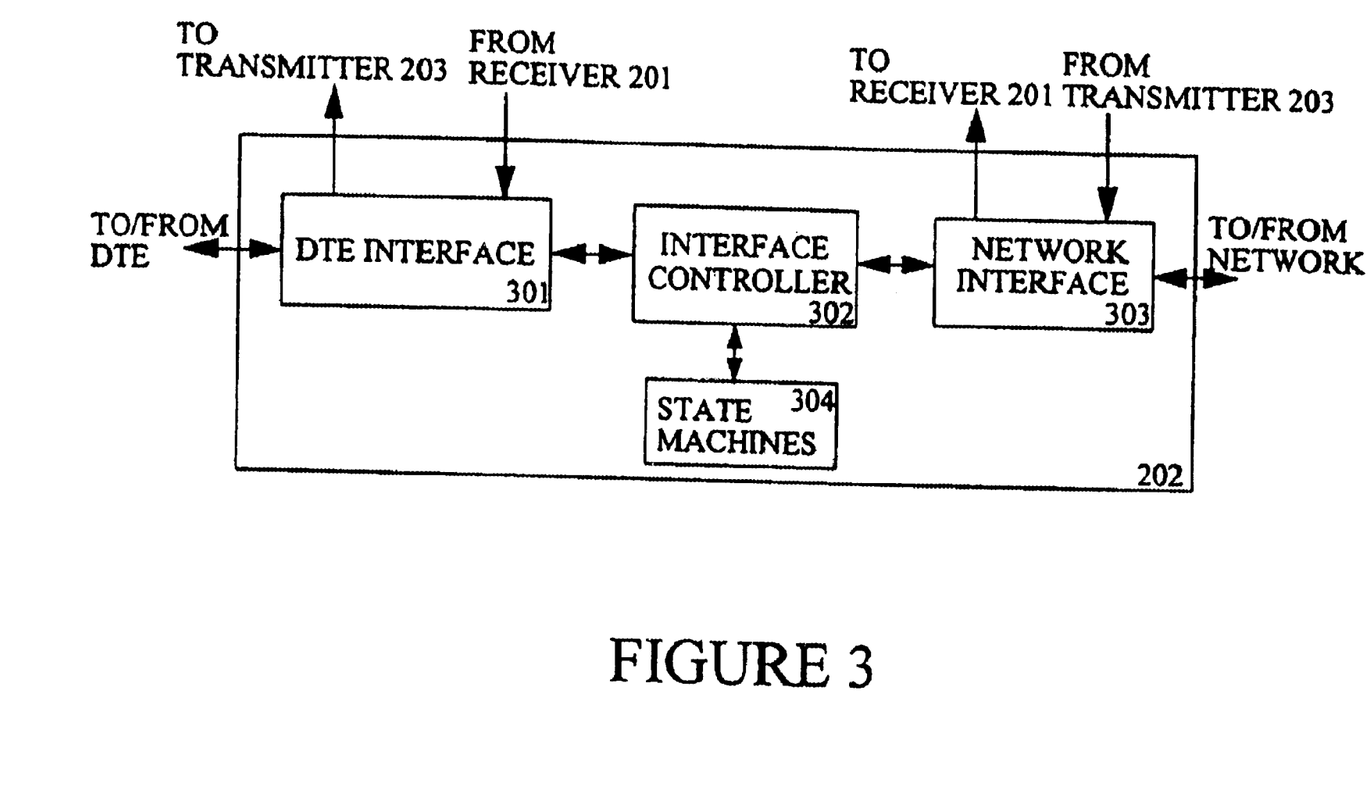
FIG. 3 is a block diagram illustrating in more detail terminal-channel interface circuit 202 of interface adapter 200.

Reference is now made to FIG. 3 illustrating in more detail terminal-channel interface circuit 202. As shown, terminal-channel interface circuit 202 comprises DTE interface circuit 301, interface controller 302, network interface circuit 303, and state machines 304. DTE interface 301 provides physical and electrical connection to the DTE thereby providing a path for signals and power to be carried between the DTE and interface adapter 200. DTE interface 301 is in turn connected to interface controller 302 which performs network initialization, transfer management (e.g., handshake, initiation, handoff, termination, and others), frequency management, modulation management, power management, error correction, encryption, compression, formatting, and packet related operations on data signals received and transmitted from/to LAN 100 in accordance to the present invention. In the preferred embodiment, interface controller 302 coordinates with state machines 304 to carry out these tasks. Alternatively, interface controller 302 may carry out the above tasks by executing the instructions stored in a Read Only Memory (ROM) that is connected to interface controller 302.

Network interface 303 provides physical and electrical connection to LAN 100 thereby providing a path for signals and power to be carried between LAN 100 and interface adapter 200. Network interface 303 is connected to interface controller 302, receiver 201, and transmitter 203. In the receive mode, upon receiving data from LAN 100, network interface 303 sends the received data to receiver 201 which demodulates the data according to a predetermined demodulation scheme under the control and coordination of interface controller 302 carries these processing tasks out. The demodulated data from receiver 201 is then sent to DTE interface 301 for transferring to the DTE.

Conversely, in the transmit mode, data from the DTE is sent to transmitter 203 via DTE interface 301. Transmitter 202 modulates the data according to a predetermined modulation scheme under the control and coordination of interface controller 302 carries these processing tasks out. The modulated data from transmitter 202 is then sent to network interface 303 for transmitting to hub 110 over medium 109.

Hub 110 then forwards the information received to a final destination (e.g., another device connected to LAN 100). In the alternative embodiment of LAN 100 in which hub 110 is omitted, network interface 303 transmits the information directly to the final destination.

Figure 4:
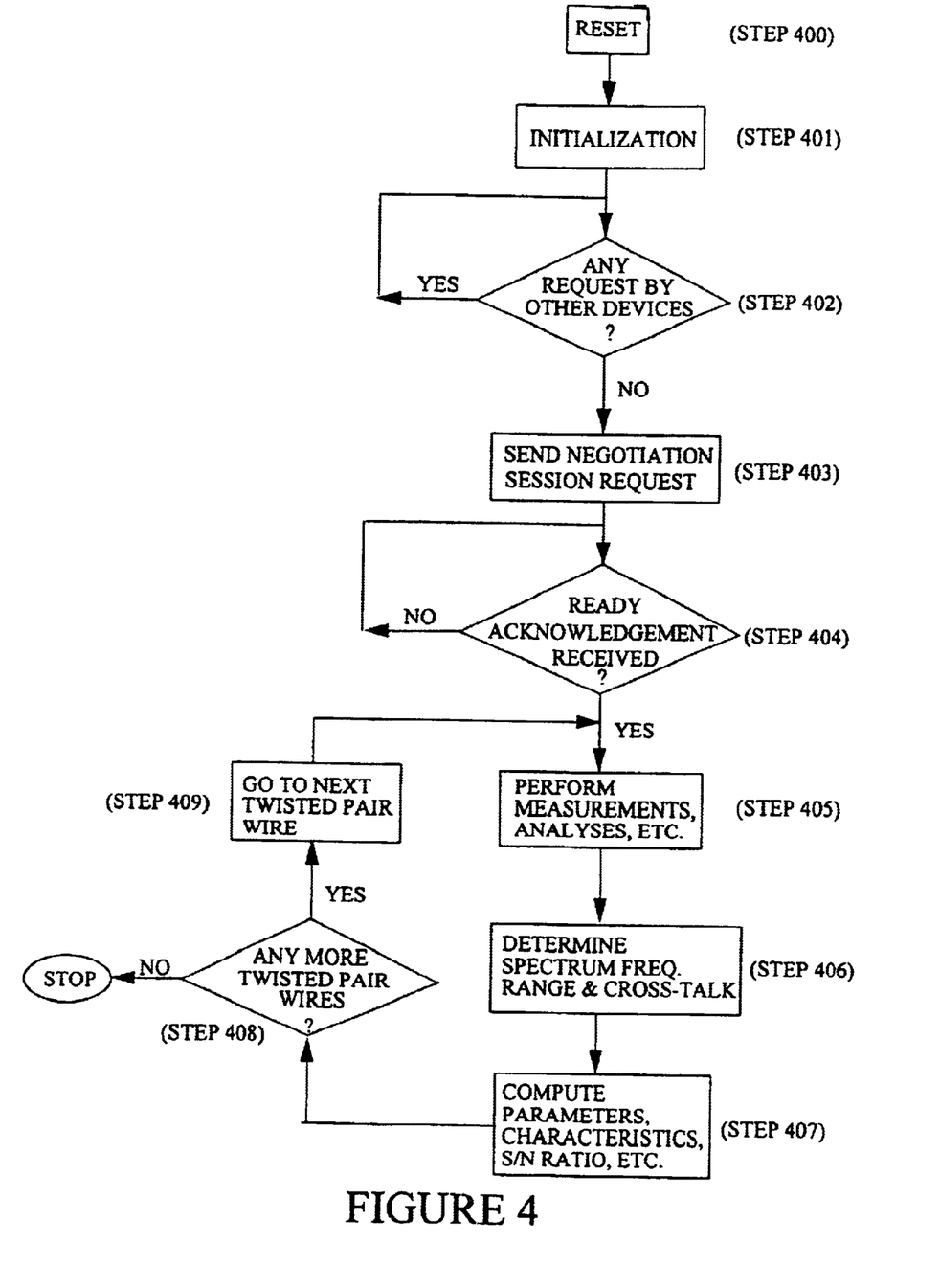
FIG. 4 is a flow chart illustrating, for example, some of the major steps involved during the network initialization phase, which may occur immediately after reset during the power-up phase.

Referring now to FIG. 4 illustrating, for example, some of the major steps/states involved during the network initialization phase, which may occur immediately after reset during the power-up phase. It should be clear to a person of ordinary skill in the art that the steps/states in FIG. 4 may have a different sequence than that shown and still be within the scope of the present Invention. In accordance to the present invention, such network initialization is needed to establish a number of key parameters such as expected data rate, error correction scheme, modulation parameters, connection type (e.g., LAN, disk, multidrop, etc.), and others that are subsequently shared by interface controller 302, receiver 201, and transmitter 203 in carrying out a transfer operation. In the preferred embodiment, during a period of idleness, the network initialization process may continue in the form of ongoing calibration to gather measurements and statistics to optimize communication over the link. Such calibration may also be performed whenever there is a changed condition in the wire's capacity such as a loss of a twisted pair wire, an addition of a twisted pair wire, improvement in signal-to-noise ratio, etc.

Briefly, the above parameters are computed based on information derived from the interaction and information exchange between hub 110 and a device connected to LAN 100 which are involved in the present data transfer. In the alternative embodiment where hub 110 is omitted from LAN 100, the above parameters are determined from the interaction and information exchange between any two devices connected to LAN 100 that are involved in the present data transfer. For example, these two devices may be computer systems 101 and 102, computer system 103 and server 105, server 105 and peripheral device 107, etc. In either embodiment of LAN 100, examples of the exchanged information include: 1) the number of twisted pair wires that connect the two devices at hand; 2) the device designated to act as the DTE and the device designated as the Data Communications Equipment (DCE) during the current data transfer; 3) the electrical characteristics profile (e.g., impedance, capacitance, resistance, shield, crosstalk between twisted pair, signal loss, etc.) of each twisted pair wire connecting the two devices (DTE and DCE) in their current condition; 4) the identification of the twisted pair wire at the designated DTE and its corresponding twisted pair wire at the designated DCE; 5) the protocol-related capabilities (e.g., compression, encryption, modulation, echo canceling, forward error detection, forward error correction, etc.) of each machine; 6) the expected data transmission signal-to-noise (S/N) ratio or error rate; 7) the power and termination impedance to allow the designated DTE to use the maximum allowable signal power for data transferring while meeting Federal Communications Commission (FCC) guidelines thereby resulting in the maximum signal-to-noise ratio; 8) the distance between the two devices (i.e., DTE and DCE) and the associated round-trip delay; and 9) buffering and flow control (e.g., for video packet transfer technology).

In step 400, all the states are reset prior to the start of the network initialization process. Next, certain registers and variables of interface adapter 200 are initialized with predetermined values for subsequent calculations (step 401). In step 402, interface adapter 200 monitors network for a predetermined period of time to determine whether there are any requests by other devices connected to the LAN for its access. If there are other requests during this time period, interface adapter 200 continues its monitoring. Otherwise, if there is no other request during this time period, interface adapter 200 sends a signal to the hub requesting a negotiation session (step 403). Interface adapter 200 then monitors its input to determine whether an acknowledgement response has been received from the hub indicating that it is ready for a negotiation session (step 404).

If no such acknowledgment response is received, the source interface adapter continues its monitoring. Otherwise, interface adapter 200 of the designated DTE communicates with interface adapter 200 of the designated DCE regarding the various measurements, analyses, and optimizing techniques that must be coordinated and carried out between interface adapters 200 of the designated DTE and DCE to determine the parameters discussed earlier (step 405). More particularly, frequency spread search, signal quality analysis, attenuation measurement, echo canceling study, optimal gain setting analysis, optimal termination analysis, optimal filtering analysis, etc. are coordinated and carried out between the designated DTE and DCE. Based on these measurements, analyses, and optimization techniques especially given the known characteristics and limitations of the designated DTE and DCE as well as medium 109, a range of available spectrum frequencies and cross-talks can be determined for communicating between the designated DTE and DCE (step 406). Using the range of spectrum frequencies available, the characteristics of the designated DTE, DCE, the medium, as well as the allowable signal-to-noise (S/N) ratio, important modulation parameters such as the maximum allowable data transfer rate and error correction parameters can be determined (step 407). Next, it is determined whether there is any more twisted pair wires in the connection between the DTE and DCE at hand (step 408). If there are more twisted pair wires, the next twisted pair wire is selected (step 409) and steps 405–407 are repeated. Otherwise, the network initialization process is completed by taking the cross talk measurements between the twisted pair wires.

Before two machines in LAN 100 can communicate with each other, the parameters generated from the network initialization process above are utilized by interface adapters 200 of the designated DTE and DCE in a negotiation session. The negotiation session seeks to establish the data transfer scheme between the two machines (e.g., how data is transferred over various twisted pair wires) and to determine the best use of the available bandwidth. Accordingly, part of this negotiation includes the selection of compression algorithms for use in the data transfer. Moreover, the negotiation further includes reservation of part of the bandwidth for isocronous data and/or other non-LAN uses such as streaming video. In the preferred embodiment, the protocol between two machines connected to LAN 100 is similar to the Transmission Control Protocol (TCP) wherein streams of data packets organized in frames having built-in flow control and retransmission mechanisms are transmitted. This protocol allows hub 110 to use memory buffers to compensate for the different transfer rates to prevent packet loss. As such, under this approach, during the negotiation session above, the transmission parameters further need to include allowable frame size, time-out period, acknowledgement etc. Other transmission parameters to be negotiated include the acceptable level of cross talk between twisted pair wires, protocol technique to be used for data transfer, etc. These parameters are used to improve the data transfer quality as well as the data transfer rate. Furthermore, in accordance to the present invention, a session key is negotiated in the network initialization process for use in decoding encrypted data messages. In general, a session key is generated each time a network initialization process is performed (e.g., at computer power up, etc.).

In another aspect of the present invention, using the parameters derived from the 'mating dance' namely the connecting wires' impedance, resistance, twisted pair crosstalk characteristics, capacitance, reflection, other electrical characteristics, state machines 304 establish an electrical model (e.g., a transform function) for each twisted pair of the connecting wire. Using such electrical model, state machine 304 can predict the signal that is likely to be received at the DCE end of the wire in response to a data signal supplied by the DTE. This prediction allows compensations/adjustments to be made to the data signal supplied by the DTE so that a desired signal (e.g., highest fidelity and least distorted signal) can be received at the DCE. Such compensations/adjustments can be determined, for example, by computing the inverse transform function. In short, necessary signal compensations/adjustments are determined based on the parameters derived from the 'mating dance' in a forward control fashion. Some of the signal compensations/adjustments may be adding/subtracting the capacitance, inductance, and resistance of the termination at either or both ends of the wire. Other compensations/adjustments may be having the DCE generating an echo cancellation signal to overcome cross-talks or coordinating the DTE and DCE ends to ensure a good termination at the receiving end to improve the signal-to-noise ratio.

Figure 5:
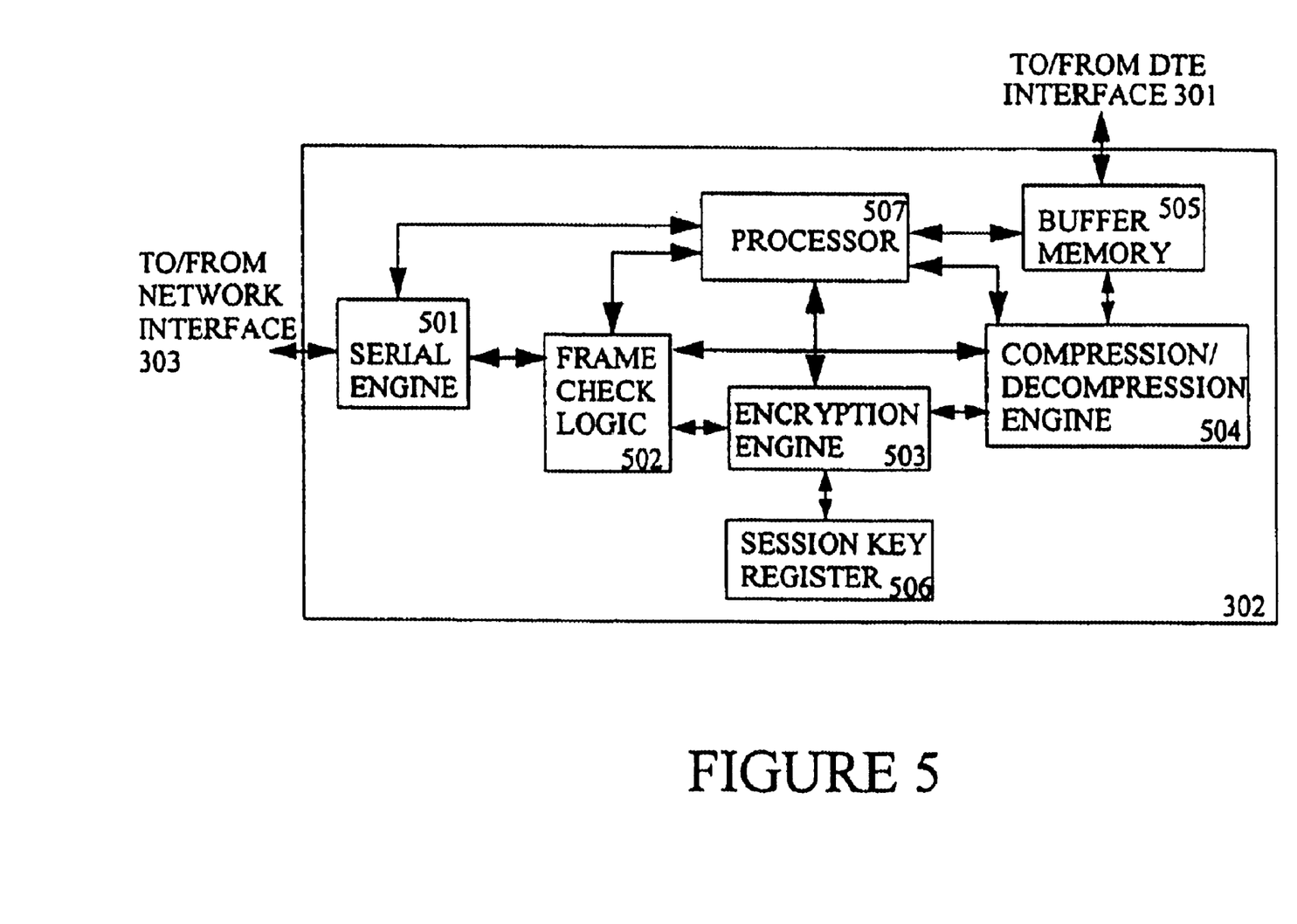
FIG. 5 is a block diagram illustrating in greater detail interface controller 302 of terminal-channel interface circuit 202.

Reference is now made to FIG. 5 illustrating a block diagram of interface controller 302. Interface controller 302 includes serial engine 501, frame check logic 502, encryption/decoding engine 503, compression/decompression engine 504, buffer memory 505, session key register 506, and processor 507. Processor 507 oversees and coordinates the data processing during receive mode and transmit mode. For example, processor 507 determines the formatting required, whether encryption is involved, whether compression is involved, etc., and takes the required steps to ensure that the desired processing is carried out. During receive mode, serial engine 501 converts serial data receives over the LAN into parallel data prior to sending it to frame check logic 502 which performs cyclic redundancy check (CRC) on the data to determine its validity. Alternatively, instead of CRC, frame check logic 502 may perform error code correction (ECC) if it is determined that the data is incorrect. In accordance to the present invention, data are transferred in data frames each of which consists of multiple data packets. By transferring data in data frames each of which is made up of multiple packets, data compression, error checking, and error correction can be carried out more efficiently. As a result, the data transfer rate can be increased and latency minimized.

Frame check logic 502 outputs the data to encryption engine 503 for data decoding. In the preferred embodiment, encryption engine 503 implements the International Data Encryption Algorithm (IDEA) which is a well-known encryption technique. It is to be appreciated that other encryption techniques can be implemented as well. Register 506 is used to store the session key that has been selected by during the network initialization process. After encrypted data is decoded by encryption engine 503 using the session key stored in register 506, it is sent to compression/decompression engine 504 to be decompressed according to a decompression scheme selected by processor 507. In the case where no encryption is involved, frame check logic 502 outputs the data directly to compression/decompression engine 504 to be decompressed. Decompressed data is then sent to buffer memory 505 for temporary storage before being sent to the DCE. If there is no compression, frame check logic 502 outputs the data directly to buffer memory 505.

During transmit mode, data from the DTE is sent to buffer memory 505 which accumulates the data. Processor 507 formats the data into a predetermined number of packets which in turn make up a data frame. A data frame is sent to compression/decompression engine 504 to be compressed according to a scheme selected by processor 507. Compressed data is then sent to encryption engine 503 for data encryption thereby providing the desired data security. If compression is not involved (e.g., compression/decompression engine 504 is not enabled by processor 507), a data frame from buffer memory 505 bypasses compression/decompression engine 504 and is sent to encryption engine. Encrypted data from encryption engine 503 is sent to serial engine 501 to be converted into a serial data stream prior to being sent to a DCE over the LAN.

Figure 6:
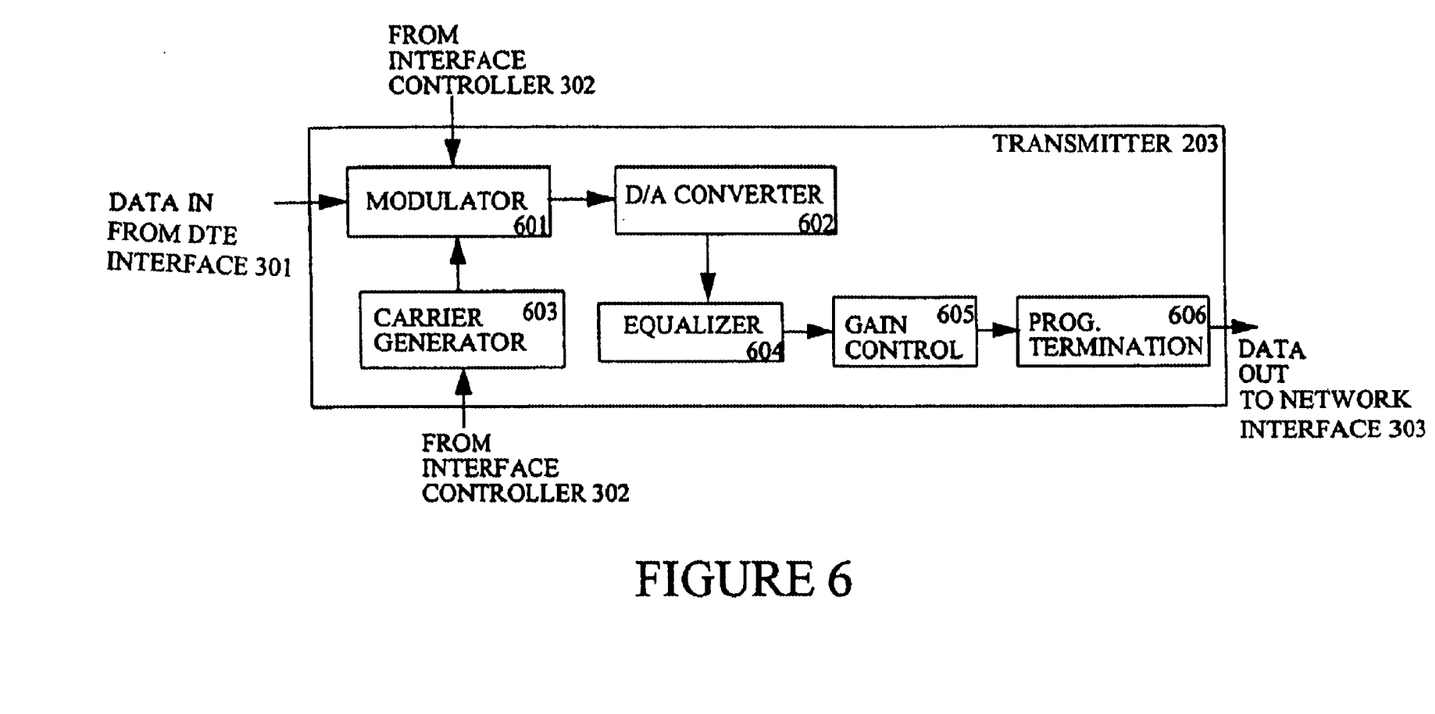
FIG. 6 is a block diagram illustrating in greater detail transmitter 203 of interface adapter 200.

Referring now to FIG. 6 illustrating a block diagram of transmitter 203. As shown in FIG. 6, transmitter 203 comprises modulator 601, D/A converter 602, carrier generator 603, equalizer & filter 604, gain control circuit 605, and programmable termination circuit 606. In the preferred embodiment, transmitter 203 implements a spread spectrum modulation communication technique in the transmit process. However, it is to be appreciated that other well-known modulation techniques such as Quadrature Amplitude Modulation (QAM), Frequency Division Multiple Access (FDMA), Time Division Multiple Access (TDMA), a combination of different techniques, and others can be implemented as well. These modulation techniques are conventional and well known to a person of ordinary skill in the art.

In the present embodiment, the frequency hopping spread spectrum communication is implemented. It should be clear to a person of ordinary skill in the art that direct sequence spread spectrum modulation can also be easily implemented. As shown in FIG. 6, data to be transmitted is received from the DTE via DTE interface 301 and sent to modulator 601 inside transmitter 203. Modulator 601 modulates the data signal using spread spectrum modulation technique.

The carrier frequencies that are used to modulate the data signal is generated by carrier generator 603 which may be a state machine that is controlled by interface controller 302. In general, the carrier frequencies are generated as follows. First, a set of frequency coded signals are generated algorithmically. This forms the basic signal set. Next, each signal of the basic signal set is divided into several shorter signals. This subdivision retains the same properties as the basic signal set, but provides a much larger set Each signal produced thereby defines a carrier frequency to be used as part of the spread spectrum communication scheme. Each of the carrier frequencies is assigned a position in a carrier frequency sequence. The order of the carrier frequencies can be changed randomly or otherwise to produce different frequency sequences that are used to determine the order of the frequency switching. In the preferred embodiment, the order of the carrier frequencies is controlled by using interface controller 302 to Introduce the desired delays for each carrier frequencies and using corresponding bandpass filters in conjunction with these programmable delay circuitry. In addition, this desired switching sequence is communicated between the source and the destination in advance as part of the handshake process.

The modulated data signal is then sent to equalizer & filter circuit 604 which Is used to compensate for the nominal characteristics of the transmission medium and eliminates noises and other unwanted signals. More particularly, the equalizer circuit in equalizer & filter circuit 604 compensates for expected amplitude distortion in the transmission medium (e.g., cat-5 twisted pair wiring) and for the expected group delay problem. In general, group delay measures the amount by which a signal of one frequency travels faster in the transmissions medium than a signal of a different frequency. The equalizer circuit then compensates for the average expected speed difference. The filtering circuit in equalizer & filter 604 include a series of filters such as bandpass and lowpass filters. Each bandpass filter allows signal with a predetermined carrier frequency to pass through. When such programmable bandpass filter is used in conjunction with programmable delay circuitry, signals with different carrier frequencies can be transmitted in the desired sequence. In the preferred embodiment, interface controller 302 programs the desired frequencies and the delay values in the bandpass filters and delay circuitry, respectively.

Lowpass filters are used to eliminate noises and other undesirable high frequency signals. It should be clear to a person of ordinary skill in the art that other types of conventional filters (e.g., highpass, etc.) may also be included. The output of equalizer & filter circuit 604 is then sent to gain control circuit 605 which controls the gain of the transmit signal. In the preferred embodiment, the power of the transmit signal is amplified to a level slightly below the FCC limit. This amplification improves the signal-to-noise ratio. The output of gain control circuit 605 is then provided to programmable termination circuit 606 that is designed to prevent impedance mismatch between the wire (medium) and transmitter 203. In so doing, signal reflection and termination effects are reduced thereby allowing the power of the signal to be maximized. The output of programmable termination circuit 606 is then sent to interface controller 302 to be transmitted under the control of interface controller 302 (e.g., following the establishment of the handshake process) to its destination over the medium.

Figure 7:
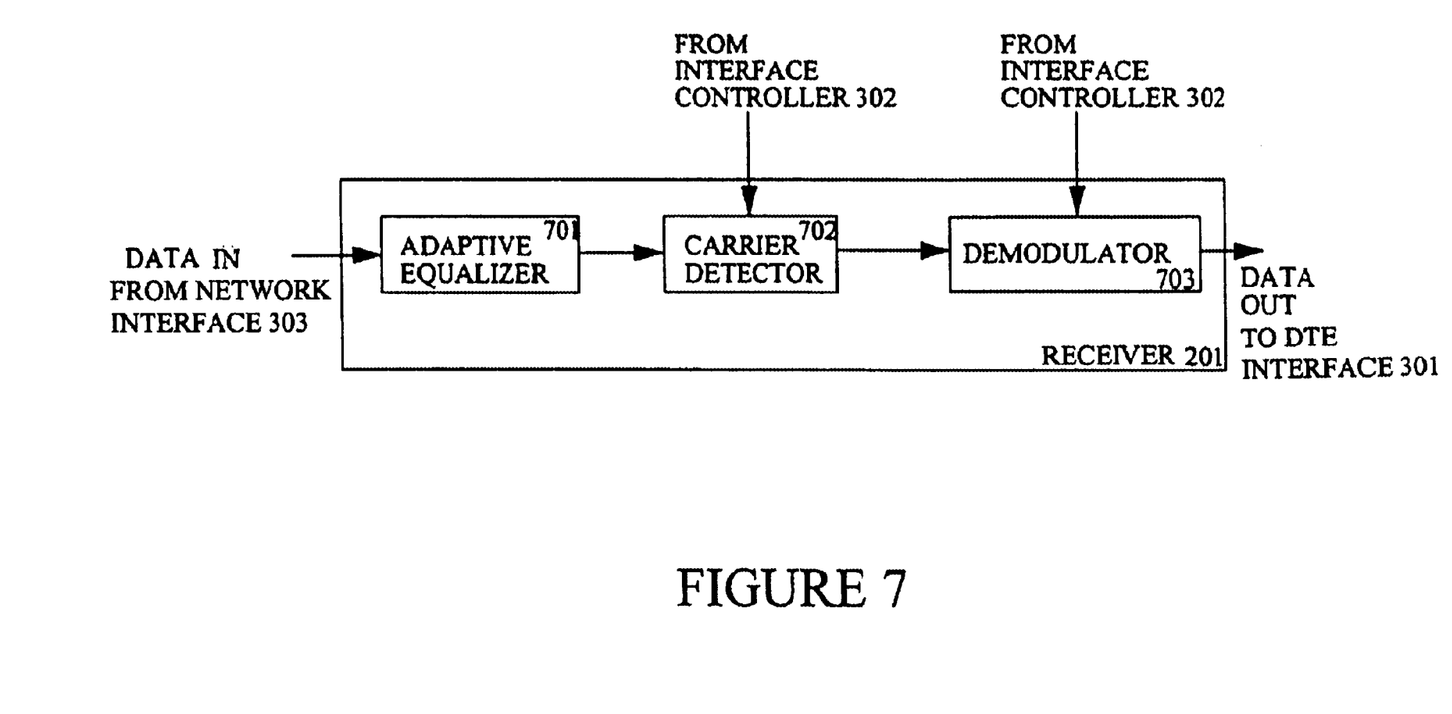
FIG. 7 is a block diagram illustrating in greater detail receiver 201 of interface adapter 200.

Referring now to FIG. 7 illustrating a block diagram of receiver 201. As shown in FIG. 7, receiver 201 comprises equalizer & filter 701, carrier detector 702, and demodulator 703. In general, receiver 201 performs the opposite function (i.e., compressing the spread spectrum signal) as transmitter 203. In particular, receiver 201 preferably implements frequency hopping spread spectrum communication in the receive process. However, it is to be appreciated that other well-known modulation techniques such as Frequency Division Multiple Access (FDMA), Time Division Multiple Access (TDMA), a combination of different techniques, and others can be implemented as long as they are consistent with the technique chosen for transmitter 203.

As shown in FIG. 7, data received from a source over the medium is received by network interface 303 and subsequently sent to equalizer & filter 701 inside receiver 201. The equalizer circuitry in equalizer & filter 701 compensates for the actual group delay distortion errors introduced in the transmission path. This is done by measuring errors observed in the received signal and adjusts some parameters to track slowly varying changes in the condition of the transmission line. The filtering circuit in equalizer & filter 701 includes a series of filters such as lowpass filters. Lowpass filters are used to eliminate noises and other undesirable high frequency signals. It should be clear to a person of ordinary skill in the art that other types of conventional filters (e.g., highpass, etc.) may also be included.

The output from equalizer & filter 701 is provided to carrier detector 702, which is designed to receive signals with different carrier frequencies in the desired sequence. This desired switching sequence is consistent with that transmitted by transmitter 203 of the source and is communicated to carrier detector 702 by interface controller 302. Accordingly, the desired switching sequence must be communicated between the source and the destination as part of the handshake process. In the preferred embodiment, carrier detector 702 may consist of bandpass filters that is programmed by interface controller 302 to allow signal with a predetermined carrier frequency to pass through. Such bandpass filters are used in :conjunction with programmable delay circuitry to receive signals with different frequencies In the desired sequence. The delay circuitry is programmed by interface controller 302 to have a desired delay for each corresponding carrier frequency.

The output of carrier detector 702 is provided to demodulator 603 which demodulates the data signal. Obviously, the demodulation technique carried out by demodulator 703 should be consistent with the modulation technique carried out by modulator 602. Demodulator 703 provides its output to DTE interface 301, which in turn sends it to the DTE.

The preferred embodiment of the present invention, an apparatus, method, and system to provide an open, easy-to-use, robust, and reliable LAN that is capable of handling high data throughput and high bandwidth communication applications and at the same time, is adaptive to changing conditions, is thus described. While the present invention has been described in particular embodiments, the present invention should not be construed as limited by such embodiments, but rather construed according to the below claims.

What is claimed is:

1. A Local Area Network (LAN) interface adapter apparatus comprising:
   an interface circuit coupled between a first data terminal device and a LAN, comprising:
      means for performing a network initialization process with a second data terminal device having a substantially similar interface adapter apparatus coupled to the LAN prior to a data transfer between the first and second data terminal devices, the means for performing a network initialization process comprising:
         first means for determining information related to available data throughput, optimized bandwidth, optimized transfer conditions, and electrical characteristics of a connection between the devices;
         second means for performing a frequency spread search, a signal quality analysis, an attenuation measurement, an echo canceling study, and an optimal filtering analysis;
         third means for Generating transmission parameters in response to the first and second means; and
      means for encrypting data for transmission and decoding encrypted data received;
   a transmit circuit coupled to the interface circuit, comprising means for transmitting data having the transmission parameters generated by the third means; and
   a receive circuit coupled to the interface circuit, comprising means for receiving data having the transmission parameters generated by the third means.

2. The apparatus of claim 1, wherein the means for performing a network initialization process further comprises means for determining a session key for decoding encrypted data.

3. The apparatus of claim 2, wherein the means for performing a network initialization process further comprises means for determining which one of the first or second data terminal devices is designated a Data Terminal Equipment (DTE) and which is designated a Data Communication Equipment (DCE).

4. The apparatus of claim 2, wherein the transmit circuit further comprises means for making forward adjustments and compensations on a data signal in response to electrical characteristics of the connection between the first and second data terminal devices.

5. The apparatus of claim 4, wherein the transmit circuit further comprises means for formatting transmitting data in data frames such that each data frame is made up of multiple data packets.

6. The apparatus of claim 5, wherein the LAN is compatible with 10baseT and 100baseT LANs.

7. The apparatus of claim 5, wherein the interface circuit further comprises means for commencing the network initialization process response to a system power-up phase.

8. The apparatus of claim 7, wherein the interface circuit further comprises means for commencing the network initialization process in response to idle periods and for storing the determined information in a database for use in subsequent analyses.

9. The apparatus of claim 8, wherein the interface circuit further comprises means for directing the transmit circuit transmit data pursuant to a predetermined modulation communication technique.

10. The apparatus of claim 9, wherein the predetermined modulation communication technique is spread spectrum.

11. The apparatus of claim 10, wherein second means further determines a range of spread spectrum frequencies.

12. The apparatus of claim 4, wherein the first means further comprises means for determining an allowable signal-to-noise (S/N) ratio, an allowable cross-talk level, an allowable echo level, and an allowable attenuation level.

13. The apparatus of claim 12, wherein the first means further comprises means for determining capacitance, inductance, and resistance of a wire connecting the first and second data terminal devices.

14. The apparatus of claim 6, wherein the interface circuit is coupled to the LAN with twisted pair wires.

15. The apparatus of claim 14, wherein the interface circuit is coupled to the LAN with category-3 twisted pair wires.

16. The apparatus of claim 15, wherein the means for performing a network initialization process performs a network initialization process for each twisted pair wire in a device connection.

17. A LAN system comprising:
   a hub having a plurality of ports, the hub buffering data received and managing data flows between the plurality of ports; and
   a plurality of data terminal devices coupled to the plurality of the ports of the hub by a connecting medium, the plurality of devices transferring data to each other;
   wherein the hub and each of the plurality of data terminal devices include a network interface apparatus comprising:
      means for performing a network initialization process with a second data terminal device having a substantially similar interface adapter apparatus coupled to the LAN prior to a data transfer between the first and second data terminal devices, the means for performing a network initialization process comprising:
         first means for determining information related to available data throughput, optimized bandwidth, optimized transfer conditions and electrical characteristics of a connection between the devices;

second means for performing a frequency spread search, a signal quality analysis, an attenuation measurement, an echo canceling study, and an optimal filtering analysis;

third means for generating transmission parameters in response to the first and second means; and means for encrypting data for transmission and decoding encrypted data received;

a transmit circuit coupled to the interface circuit, comprising means for transmitting data having the transmission parameters generated by the third means; and a receive circuit coupled to the interface circuit, comprising means for receiving data having the transmission parameters generated by the third means.

18. The LAN system of claim 17, wherein the means for performing a network initialization process further comprises means for determining a session key for decoding encrypted data.

19. The LAN system of claim 18, wherein the means for performing a network initialization process further comprises means for determining which one of the first or second data terminal devices is designated a Data Terminal Equipment (DTE) and which is designated a Data Communication Equipment (DCE).

20. The LAN system of claim 18, wherein the transmit circuit further comprises means for making forward adjustments and compensations on a data signal in response to electrical characteristics of the connection between the first and second data terminal devices.

21. The LAN system of claim 20, wherein the transmit circuit further comprises means for formatting transmitting in data frames such that each data frame is made up of multiple data packets.

22. The LAN system of claim 21, wherein the LAN is compatible with 10baseT and 100baseT LANs.

23. The LAN system of claim 21, wherein the interface circuit further comprises means for commencing the network initialization process in response to a system power-up phase.

24. The LAN system of claim 23, wherein the interface circuit further comprises means for commencing the network initialization process in response to idle periods and for storing the determined information in a database for use in subsequent analyses.

25. The LAN system of claim 24, wherein the interface circuit further comprises means for directing the transmit circuit transmit data pursuant to a predetermined modulation communication technique.

26. The LAN system of claim 25, wherein the predetermined modulation communication technique is spread spectrum.

27. The LAN system of claim 26, wherein second means further determines a range of spread spectrum frequencies.

28. The LAN system of claim 20, wherein the first means further comprises means for determining an allowable signal-to-noise (S/N) ratio, an allowable cross-talk level, an allowable echo level, and an allowable attenuation level.

29. The LAN system of claim 28, wherein the first means further comprises means for determining capacitance, inductance, and resistance of a wire connecting the first and second data terminal devices.

30. The LAN system of claim 22, wherein the interface circuit is coupled to the LAN with twisted pair wires.

31. The LAN system of claim 30, wherein the interface circuit is coupled to the LAN with category-3 twisted pair wires.

32. The LAN system of claim 31, wherein the means for performing a network initialization process performs a network initialization process for each twisted pair wire in a device connection.

33. A computer system adapted for use as a data terminal device, the computer system comprising:

a bus;

a central processor connected to the bus;

memory connected to the bus;

a LAN interface adapter apparatus comprising:

an interface circuit coupled between first data terminal device and a LAN, comprising:

means for performing a network initialization process with second data terminal device having a substantially similar interface adapter apparatus coupled to the LAN prior to a data transfer between the first and second data terminal devices, the means for performing a network initialization process comprising:

first means for determining information related to available data throughput, optimized bandwidth, optimized transfer conditions, and electrical characteristics of a connection between the devices;

second means for performing a frequency spread search, a signal quality analysis, an attenuation measurement, an echo canceling study, and an optimal filtering analysis;

third means for generating transmission parameters in response to the first and second means; and means for encrypting data for transmission and decoding encrypted data received;

a transmit circuit coupled to the interface circuit, comprising means for transmitting data having the transmission parameters generated by the third means; and a receive circuit coupled to the interface circuit, comprising means for receiving data having the transmission parameters generated by the third means.

34. A method operating a LAN that is capable of handling high data throughput and high bandwidth communication applications and is adaptive to changing conditions, the method comprising the steps of:

performing a network initialization process between two data terminal devices having substantially similar interface adapter apparatuses coupled to a LAN prior to a data transfer between the two data terminal devices, wherein the network initialization process comprises:

determining information related to available data throughput, optimized bandwidth, optimized transfer conditions, and electrical characteristics of a connection between the two data terminal devices; and performing a frequency spread search, a signal quality analysis, an attenuation measurement, an echo canceling study, and an optimal filtering analysis;

encrypting data for transmission;

decoding encrypted data received; and transferring data between the two data terminal devices utilizing the information determined from the network, initialization process.

35. A local area network (LAN) interface adapter comprising:

a transmit circuit coupled to transmit data to a LAN;

a receive circuit coupled to receive data from the LAN;

an interface circuit coupled between a first data terminal device and the LAN, comprising:

a data terminal equipment (DTE) interface coupled to a first data terminal device, the transmit circuit and the receive circuit;

a network interface coupled to the LAN, the transmit circuit and the receive circuit;

whereby:

in a receive mode, the network interface receives data from the LAN, transmits the data to the receive circuit to be processed, and the receive circuit transmits the processed data to the DTE interface to be transmitted to the DTE; and in a transmit mode, the DTE interface receives data from the DTE, transmits the data to the transmit circuit to be processed, and the transmit circuit transmits the processed data to the network interface to be transmitted to the LAN; and an interface controller coupled to the DTE interface and the network interface, comprising a processor programmed to:

determine information related to available data throughput, optimized bandwidth, optimized transfer conditions, and electrical characteristics of a connection between the first data terminal device and a second data terminal device coupled to the LAN;

perform a frequency spread search, a signal quality analysis, an attenuation measurement, an echo canceling study, and an optimal filtering analysis;

generate transmission parameters in response to the determining and performing operations; and transmit the data transmission parameters to the DTE interface and the network interface, whereby, in response to the data transmission parameters:

the DTE interface provides compensations and adjustments to the data signal received from the DTE; and the network interface provides compensations and adjustments to the data signal received from the LAN.

36. The interface adapter of claim 35, the processor further programmed to:

initiate a negotiation session with the second data terminal device; and exchange information with the second data terminal device, including at least one exchanged information selected from the group comprising:

the number of twisted pair wires which connect the first and second data terminal devices;

the device designated to act as the data terminal equipment (DTE) device;

the device designated to act as the data communications equipment (DCE) device;

the electrical characteristics profile of each twisted pair wires which connect the first and second data terminal devices;

the identification of the twisted pair wires at the designated DTE;

the identification of the twisted pair wires at the designated DCE;

the protocol-related capabilities of the device designated as the DTE;

the protocol-related capabilities of the device designated as the DCE;

the expected data transmission signal-to-noise ratio;

the expected data transmission error rate;

the power and termination impedance resulting in a maximum signal-to-noise ratio;

the distance between the first and second data terminal devices; and the buffering and flow control technology used between the first and second data terminal devices.

37. A local area network (LAN) interface adapter comprising:

a transmit circuit coupled to transmit data to a LAN;

a receive circuit coupled to receive data from the LAN;

an interface circuit coupled between a first data terminal device and the LAN, comprising:

a data terminal equipment, (DTE) interface coupled to a first data terminal device, the transmit circuit and the receive circuit;

a network interface coupled to the LAN;

an interface controller coupled to the DTE interface and the network interface, comprising:

a processor;

a serial engine, responsive to control signals from the processor, coupled to the network interface;

frame check logic, responsive to control signals from the processor, coupled to the serial engine;

a encryption engine, responsive to control signals from the processor, coupled to the frame check logic;

a compression/decompression engine, responsive to control signals from the processor, coupled to the frame check logic and the encryption engine; and a buffer memory, responsive to control signals from the processor, coupled to the DTE interface and the compression/decompression engine.

38. The local area network interface adapter of claim 37, the transmit circuit comprising:

a modulator, responsive to control signals from the processor, coupled to receive signals from the DTE interface;

a carrier generator, responsive to control signals from the processor, coupled to the modulator;

a D/A converter coupled to receive modulated signals from the modulator;

an equalizer coupled to receive converted signals from the D/A converter;

a gain control coupled to receive equalized signals from the equalizer; and a programmable termination circuit coupled to transmit an impedance matched signal to the network interface.

39. The local area network interface adapter of claim 37, the receive circuit comprising:

an adaptive equalizer coupled to receive data from the network interface;

a carrier detector, responsive to control signals from the processor, coupled to receive equalized signals from the adaptive equalizer; and a demodulator, responsive to control signals from the processor, coupled demodulate signals from the carrier detector and transmit the demodulated signals to the DTE interface.

* * * * *